United States Patent [19]
Sugimoto et al.

[11] 4,118,770
[45] Oct. 3, 1978

[54] INVERTER APPARATUS COMMUTATED BY AN AUXILIARY SOURCE

[75] Inventors: Sachirou Sugimoto; Kanji Katsuki, both of Amagasaki, Japan

[73] Assignee: Mitsubishi Denki Kabushiki Kaisha, Tokyo, Japan

[21] Appl. No.: 773,458

[22] Filed: Mar. 2, 1977

[30] Foreign Application Priority Data

Mar. 24, 1976 [JP] Japan .................................... 51-32267

[51] Int. Cl.² ......................................... H02M 7/515
[52] U.S. Cl. ................................................. 363/138
[58] Field of Search .................................. 363/135–138

[56] References Cited

U.S. PATENT DOCUMENTS

| | | | |
|---|---|---|---|
| 3,619,759 | 11/1971 | Seki | 363/136 |
| 3,688,182 | 8/1972 | Johnson | 363/138 |

FOREIGN PATENT DOCUMENTS

| | | | |
|---|---|---|---|
| 34,888 | 10/1967 | Japan | 363/138 |
| 439,889 | 1/1975 | U.S.S.R. | 363/138 |

*Primary Examiner*—William M. Shoop
*Attorney, Agent, or Firm*—C. M. Lorin

[57] ABSTRACT

A commutation circuit for an inverter using an auxiliary source to accumulate the energy for commutation is simplified by assigning to the main diodes mounted in series with the main thyristor of the inverter the role of preventing partial discharge of the storage devices during the commutation process.

1 Claim, 2 Drawing Figures

INVERTER APPARATUS COMMUTATED BY AN AUXILIARY SOURCE

BACKGROUND OF THE INVENTION

This invention relates to an auxiliary source for a commutation circuit used in an inverter apparatus.

In static apparatus (called hereinafter an inverter) for converting DC power into AC power of a desired frequency the so-called series diode bridge type inverter includes in each arm a series connection of a controlled rectifier element (called hereinafter a thyristor) and a diode, while commutation capacitors are generally inserted between each phase on the positive side and the negative side at a point intermediate said thyristor and diode for the purpose of extinguishing the thyristors. In general commutation occurs from one phase to another with a 120° conduction causing extinction of the thyristor of the subsequent phase on the positive side (or the negative side) through firing of the thyristor situated on the same polarity side. These are circuits employed with the current type inverter which is normally provided on the DC side with a relatively large DC reactor.

Extinction of a thyristor is due to the discharge of the commutation capacitor inserted between each phase, as earlier mentioned. However, at the start there may not be a sufficient electric charge accumulated on the commutation capacitor and the thyristor will not be turned off. This problem has been generally solved by providing an auxialiary source for the purpose of commutation. Such auxiliary sources are found in various forms.

The present invention relates to an improved auxiliary source circuit for commutation.

SUMMARY OF THE INVENTION

The invention resides in a power inverter of the series diode bridge type comprising: a direct current source for supplying energy to the inverter; series networks in each branch of said bridge including a main thyristor and a main diode; commutation capacitors each inserted between phases and connected to the junction point between a main thyristor and a main diode of a corresponding network; a commutation auxiliary source connected in circuit with the inverter through an impedance including a resistor and mounted between each phase line on the AC side of the inverter and the positive terminal of said direct current source, and between each phase line on the AC side and the negative terminal of the direct current source.

DESCRIPTION OF THE PREFERRED EMBODIMENT

Figure 1:
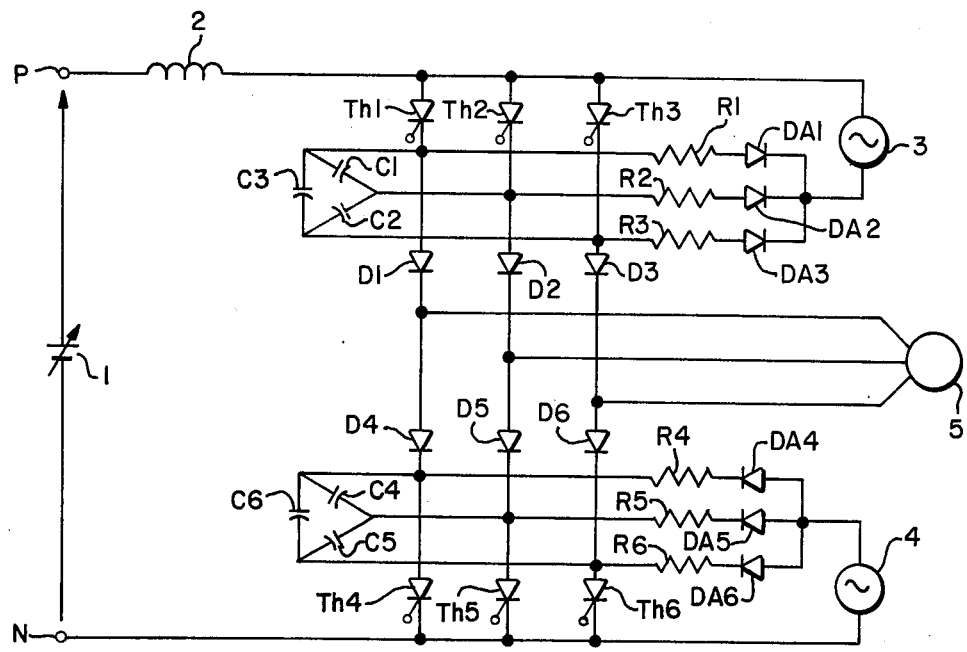
FIG. 1 is a circuit configuration illustrating the use of an auxiliary source for commutation in a conventional series diode bridge type inverter.

Referring to FIG. 1, a three phase current type inverter is shown of the series diode bridge configuration using an auxiliary source for commutation as in the prior art. A DC source 1 is connected between two terminals P and N to the corresponding electrodes of thyristors Th1, Th2, Th3 on the positive polarity side (P) and Th4, Th5, Th6 on the negative polarity side (N) of the respective phases. The series diodes are D1, D2, D3 and D4, D5, D6, respectively. A load 5 is connected to the three junction points of diodes (D1,D4), (D2,D5) and (D3,D6) of the respective phases. A relatively large reactor 2 is inserted between terminal P and the inverter. The load may be an induction motor, a synchronous motor or the like, in which case the inverter is used to control the speed of the motor. Th1 through $Th6$ are the main thyristors for the respective phases. D1 through D6 are the main diodes each in series with one main thyristor. C1 through C6 are commutation capacitors charged through resistances such as R1 to R6 from a corresponding auxiliary source 3 or 4, DA1 through DA6 are auxiliary diodes preventing the commutation capacitors from being discharged through one of the resistances.

The inverter converts DC power into AC power of the desired frequency. Firing of the main thyristors is in the order Th1, Th6, Th2, Th4, Th3, Th5 and Th1 or in the reverse order, as generally known. A detailed description of the commutation process is omitted because it is well known from other literatures, materials etc. It is sufficient to mention that with conventional auxiliary source for commutation such as shown in FIG. 1, when for instance the thyristor Th1 conducting, an ion energy is derived from the auxiliary source (3) and charged into the commutation capacitor (C1) through 3, Th1, C1, R2, DA2 and 3. When thyristor Th2 is fired, the accumulated energy is used to extinguish thyristor Th1. The same process continues from one thyristor to the next when thyristors Th2 through Th6 become successively conducting. In the absence of the auxiliary diodes DA1 through DA6 preventing the discharge of the accumulated energy, the commutation energy charged into C1, for example, discharges through R1 and R2, and some of the energy is lost to the commutation process.

Figure 2:
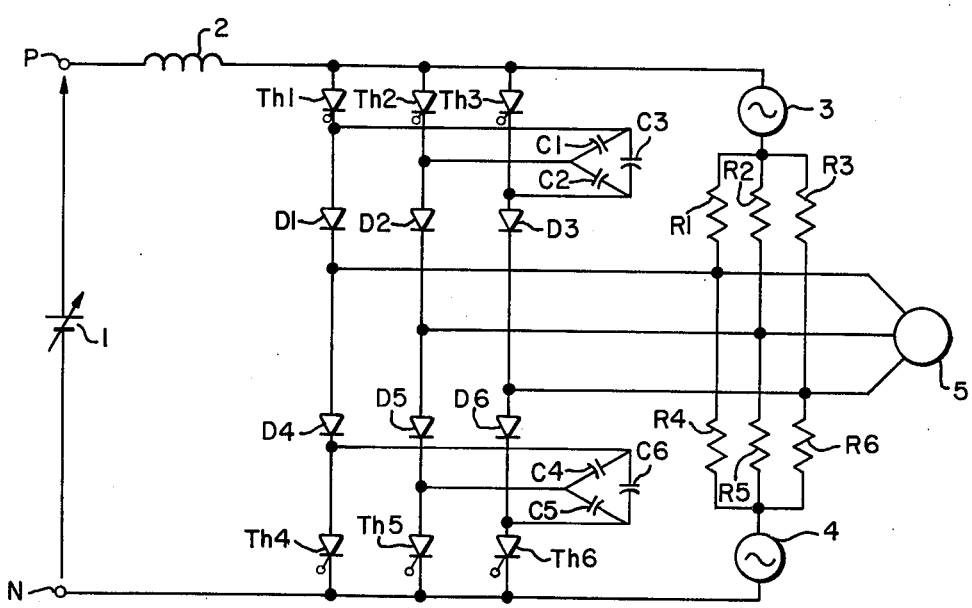
FIG. 2 shows a circuit configuration using an auxiliary source for commutation arranged in a series diode bridge type inverter in accordance with the present invention.

Referring to FIG. 2, the preferred embodiment of the invention shows an auxiliary source used in a DC diode bridge type inverter having the same configuration as in FIG. 1. Circuit components identical to those of FIG. 1 are designated in FIG. 2 by like reference numerals and characters. When thyristor Th1 for example is conducting commutation energy from the auxiliary source 3 is accumulated into the commutation capacitor C1 through 3, Th1, C1, D2, R2 and 3. This energy assures the extinction of thyristor Th1 when thyristor $Th2$ is being fired. Referring now to the role of the auxiliary source in the circuit arrangement according to the present invention as shown in FIG. 2, the main diodes D1 through D6 fulfill the roles of auxiliary diodes DA1—DA6 of FIG. 1 by the way source 3 and resistors R1–R3 and source 4 and resistors R4–R6 are being connected to the junction points of diodes (D1,D4), (D2,D5) and (D3,D6) respectively, rather than to the junction points of the main thyristor and main diodes. Since the main diode here prevent the discharge of the energy accumulated in the commutation capacitor (C1 through C6), the auxiliary diodes DA1 through DA6 of FIG. 1 become unnecessary and the circuit configuration is simplified. Furthermore while some loss more or less may be caused due to the resistance elements being connected between the output terminals on the AC output side, such loss is negligible because the charging resistances R1 through R6 have a high resistance.

We claim as our invention:

1. In a series diodes bridge type power inverter, the combination of: a direct current source for supplying energy to the inverter; series networks in each branch of said bridge including a main thyristor and a main diode, commutation capacitors each inserted between phases and connected to the junction point between a main thyristor and a main diode of a corresponding network, a commutation auxiliary source connected in circuit with the inverter through an impedance including a resistor and mounted between each phase line on the AC side of the inverter and the positive terminal of said direct current source, and between each phase line on the AC side and the negative terminal of the direct current source.

* * * * *